United States Patent
Shiga et al.

(10) Patent No.: US 12,521,698 B2
(45) Date of Patent: Jan. 13, 2026

(54) PILLAR-SHAPED HONEYCOMB STRUCTURE

(71) Applicant: NGK Insulators, Ltd., Nagoya (JP)

(72) Inventors: Yasuhiro Shiga, Nagoya (JP); Shuji Muramatsu, Nagoya (JP); Koji Motoki, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 384 days.

(21) Appl. No.: 18/162,759

(22) Filed: Feb. 1, 2023

(65) Prior Publication Data
US 2023/0311109 A1   Oct. 5, 2023

(30) Foreign Application Priority Data
Mar. 31, 2022   (JP) ................... 2022-060636

(51) Int. Cl.
*B01J 21/12* (2006.01)
*B01D 53/94* (2006.01)
(Continued)

(52) U.S. Cl.
CPC .............. *B01J 21/12* (2013.01); *B01D 53/94* (2013.01); *B01J 35/57* (2024.01); *B01J 35/657* (2024.01);
(Continued)

(58) Field of Classification Search
CPC ... B01J 21/12; B01J 35/31; B01J 35/56; B01J 35/657; B01D 53/94; F01N 3/2828
(Continued)

(56) References Cited

U.S. PATENT DOCUMENTS 6,827,754 B2 * 12/2004 Suwabe ............... B01D 46/247
  55/385.3
6,890,616 B2 *  5/2005 Suwabe ............... B28B 11/007
  422/177
(Continued)

FOREIGN PATENT DOCUMENTS

CN   107228000 A   10/2017
CN   109899133 A    6/2019
(Continued)

OTHER PUBLICATIONS

Japanese Submission of Publication (with English translation) dated May 29, 2024 (Application No. 2022-060636).
(Continued)

*Primary Examiner* — Cam N. Nguyen
(74) *Attorney, Agent, or Firm* — BURR PATENT LAW, PLLC

(57) ABSTRACT

A pillar-shaped honeycomb structure including an outer peripheral side wall, and a plurality of partition walls disposed on an inner peripheral side of the outer peripheral side wall, the plurality of partition walls partitioning a plurality of cells forming flow paths from a first end surface to a second end surface, wherein
  an average pore diameter of the partition walls measured by a mercury porosimeter is 10 μm or less, and
  when a cross section of the plurality of partition walls is observed with an X-ray microscope and porosities (%) of each partition wall is measured in a thickness direction from one surface to the other surface of each partition wall, an average porosity of each partition wall is 40 to 70%, and a difference between a maximum value and a minimum value of the porosity of each partition wall is 11% or less.

8 Claims, 8 Drawing Sheets

(51) Int. Cl.
   *B01J 35/31*   (2024.01)
   *B01J 35/56*   (2024.01)
   *B01J 35/57*   (2024.01)
   *B01J 35/64*   (2024.01)
   *F01N 3/28*   (2006.01)
   *B01J 35/32*   (2024.01)

(52) U.S. Cl.
   CPC .... *F01N 3/2828* (2013.01); *B01D 2255/9155* (2013.01); *B01J 35/32* (2024.01); *B01J 2235/00* (2024.01); *F01N 2330/32* (2013.01); *F01N 2370/02* (2013.01)

(58) Field of Classification Search
   USPC .......................................................... 502/439
   See application file for complete search history.

(56) References Cited

U.S. PATENT DOCUMENTS

| | | | | |
|---|---|---|---|---|
| 7,867,598 | B2 * | 1/2011 | Miyairi | B01J 23/40 428/116 |
| 8,143,190 | B2 * | 3/2012 | Furuta | B01D 46/24492 428/116 |
| 8,609,581 | B2 * | 12/2013 | Miyairi | B01D 46/2474 422/177 |
| 8,778,825 | B2 * | 7/2014 | Hirose | B01D 46/2482 502/80 |
| 8,814,975 | B2 * | 8/2014 | Kikuchi | B01D 46/2474 422/170 |
| 9,168,479 | B2 * | 10/2015 | Aoki | B01D 46/2455 |
| 9,217,344 | B2 * | 12/2015 | Mizuno | C04B 35/584 |
| 9,516,702 | B2 * | 12/2016 | Noro | H05B 3/06 |
| 9,567,885 | B2 * | 2/2017 | Ito | C04B 41/009 |
| 9,574,473 | B2 * | 2/2017 | Ito | C04B 38/0006 |
| 9,835,063 | B2 * | 12/2017 | Hosoi | C04B 38/0006 |
| 10,024,209 | B2 * | 7/2018 | Miyairi | F01N 3/025 |
| 10,040,016 | B1 * | 8/2018 | Iida | C04B 38/0009 |
| 10,195,813 | B2 * | 2/2019 | Ouchi | B01D 46/24491 |
| 10,369,545 | B2 * | 8/2019 | Yamamoto | F01N 3/2066 |
| 10,435,331 | B2 * | 10/2019 | Yamada | B01D 53/945 |
| 10,562,019 | B2 * | 2/2020 | Kuki | B28B 11/045 |
| 10,695,708 | B2 * | 6/2020 | Ogata | B32B 3/12 |
| 11,305,270 | B2 * | 4/2022 | Yamada | F01N 3/035 |
| 11,353,267 | B2 * | 6/2022 | Fumoto | F01N 5/02 |
| 11,383,228 | B2 * | 7/2022 | Ikoma | F01N 3/2026 |
| 11,396,009 | B2 * | 7/2022 | Takase | F01N 3/2832 |
| 11,420,195 | B2 * | 8/2022 | Takase | B01J 37/0018 |
| 11,511,268 | B2 * | 11/2022 | Ueda | C04B 35/6263 |
| 11,725,557 | B2 * | 8/2023 | Saito | F01N 3/2825 60/300 |
| 11,759,740 | B2 * | 9/2023 | Yoshioka | F01N 3/0222 502/355 |
| 12,158,093 | B2 * | 12/2024 | Noro | F01N 3/2026 |
| 12,209,526 | B2 * | 1/2025 | Kimata | B01D 46/24494 |
| 2014/0370233 | A1 * | 12/2014 | Izumi | C03C 10/0045 428/116 |
| 2016/0288449 | A1 | 10/2016 | Ouchi et al. | |
| 2016/0346776 | A1 * | 12/2016 | Omiya | B01J 35/56 |
| 2017/0274323 | A1 | 9/2017 | Yamamoto et al. | |
| 2018/0361299 | A1 | 12/2018 | Ingram-Ogunwumi et al. | |
| 2018/0363523 | A1 | 12/2018 | Ingram-Ogunwumi et al. | |
| 2019/0178126 | A1 | 6/2019 | Nagai et al. | |
| 2020/0306681 | A1 | 10/2020 | Yoshioka | |
| 2021/0001315 | A1 * | 1/2021 | Kurihara | F01N 3/2803 |
| 2021/0270161 | A1 | 9/2021 | Sendo et al. | |
| 2023/0311107 | A1 * | 10/2023 | Mase | B01J 35/56 422/174 |
| 2023/0311112 | A1 * | 10/2023 | Muramatsu | B01J 35/657 |
| 2024/0327303 | A1 * | 10/2024 | Tsuchiya | B01J 37/0018 |

FOREIGN PATENT DOCUMENTS

| | | |
|---|---|---|
| CN | 111749758 A | 10/2020 |
| JP | 2016-190198 A | 11/2016 |
| JP | 2016-204208 A | 12/2016 |
| JP | 2019-505365 A | 2/2019 |
| JP | 2021-137684 A | 9/2021 |

OTHER PUBLICATIONS

Japanese Office Action (Application No. 2022-060636) with a drafting date of Sep. 10, 2024 (with English translation) (11 pages).
Chinese Office Action (with English translation) dated Sep. 22, 2025 (Application No. 202310193684.0).

* cited by examiner

PILLAR-SHAPED HONEYCOMB STRUCTURE

CROSS REFERENCE TO RELATED APPLICATIONS

The present invention claims the benefit of priority to Japanese Patent Application No. 2022-060636 filed on Mar. 31, 2022 with the Japanese Patent Office, the entire contents of which are incorporated herein by reference in its entirety.

FIELD OF THE INVENTION

The present invention relates to a pillar-shaped honeycomb structure. More particularly, the present invention relates to a pillar-shaped honeycomb structure for exhaust gas purification.

BACKGROUND OF THE INVENTION

Exhaust gases emitted from internal combustion engines such as automobile engines contain pollutants such as soot, nitrogen oxides (NOx), soluble organic fractions (SOF), hydrocarbons (HC) and carbon monoxide (CO). For this reason, in an exhaust gas system of an internal combustion engine, it is common to install a pillar-shaped honeycomb structure carrying a suitable catalyst (oxidation catalyst, reduction catalyst, three-way catalyst, and the like) according to the pollutant to purify the exhaust gas.

A pillar-shaped honeycomb structure comprises an outer peripheral side wall, and a plurality of partition walls disposed on the inner peripheral side of the outer peripheral side wall and partitioning a plurality of cells forming flow paths from a first end surface to a second end surface. A catalyst layer containing a catalyst described above can be formed on the surface of the partition walls.

In recent years, the development of pillar-shaped honeycomb structures capable of raising the temperature of the catalyst layer to an activation temperature in a short time after starting the engine has been proceeded. In order to raise the catalyst layer to the activation temperature in a short time, it is necessary to reduce the weight of the pillar-shaped honeycomb structure. That is, it is necessary to reduce the heat capacity of the partition walls by thinning the partition walls or increasing the porosity. By doing so, the temperature of the partition walls can be raised in a short time after the exhaust gas starts to flow, and the temperature of the catalyst layer formed on the surface of the partition walls can be raised to the activation temperature in a short time. However, since there is a limit to the degree of thinning of the partition walls, increasing the porosity is considered as a method of weight reduction. As a concern in that case, a decrease in the strength of the pillar-shaped honeycomb structure is conceivable.

Under such a background, in Patent Literature 1 (Japanese Patent Application Publication No. 2016-204208), the following invention is disclosed for the purpose of providing a honeycomb structure whose exhaust gas purification performance is less likely to deteriorate, in which the temperature of the catalyst layer can be raised to the activation temperature in a short time, and cracks do not easily occur even after repeated heating and cooling cycles:

a honeycomb structure, comprising polygonal grid-shaped cell walls, a plurality of cells surrounded by the cell walls, and a catalyst layer formed on the surface of the cell walls, the honeycomb structure characterized in that:

a plurality of recesses is formed in the above cell walls; and when observing a cross-section of the above cell walls, an opening ratio of openings of deep recesses, which are the recesses having a depth of 10 μm or more from a surface of the cell walls, is 10% or more, a number of narrow recesses, which are the deep recesses with an opening length of 8 μm or less, accounts for 10% or more of a total number of the deep recesses, and a number of wide recesses, which are the deep recesses with an opening length of 20 μm or more, accounts for 10% or more of the total number of the deep recesses.

Also, as prior arts disclosing the porosity of a honeycomb structure, Patent Literature 2 (Japanese Patent Application Publication No. 2016-190198) and Patent Literature 3 (Japanese Patent Application Publication No. 2019-505365) can be exemplified.

Patent Literature 2 discloses the following invention:

a honeycomb structure, comprising polygonal grid-shaped partition walls that partition a plurality of cells extending from one end surface to the other end surface forming flow paths for fluid, wherein the partition walls are formed porous using an aggregate and a binder material different from the aggregate, a surface porosity of a surface region of the partition walls from a partition wall surface to a depth of 15% thickness of the partition walls is different from an internal porosity of an internal region from the partition wall surface to a depth of 15% to 50% thickness of the partition walls, and a difference obtained by subtracting the surface porosity from the internal porosity is more than 1.5%.

Patent Literature 3 discloses the following invention:

a particulate filter provided with at least one porous ceramic wall, wherein the wall has a microstructure having:

an average bulk porosity of greater than 55% as measured by mercury porosimetry, d50 (pore diameter) of greater than 16 μm, d90 (pore diameter) of less than 37 μm, and a surface porosity as measured by X-ray topography, which is within 10% of the bulk porosity at a midpoint of the wall.

PRIOR ART

Patent Literature

[Patent Literature 1] Japanese Patent Application Publication No. 2016-204208

[Patent Literature 2] Japanese Patent Application Publication No. 2016-190198

[Patent Literature 3] Japanese Patent Application Publication No. 2019-505365

SUMMARY OF THE INVENTION

In the invention described in Patent Literature 1, attention is paid to a plurality of recesses formed in a cell wall (synonymous with "partition wall"), and the depths and widths of the recesses are controlled. However, even if the depths and widths of the recesses near the surface of the partition walls are controlled, if the porosity variation inside the cell walls is large, stress is concentrated at locations where the porosity is high, and cracks tend to occur from there. Moreover, Patent Literature 1 does not include any specific description of the porosity.

The invention described in Patent Literature 2 controls a relationship between a surface porosity of a surface region of the partition walls from a partition wall surface to a depth of 15% thickness of the partition walls and an internal porosity of an internal region from the partition wall surface to a depth of 15% to 50% thickness of the partition walls. Although the invention described in Patent Literature 2 recommends that the difference between the two is large in order to suppress an increase in pressure loss, this adversely affects the strength of the pillar-shaped honeycomb structure. Also, if each region includes locations where the porosity is locally high, stress concentrates on those locations, and cracks are likely to occur from there. In addition, Patent Literature 2 describes that the surface porosity is in the range of 10% to 50%, and the internal porosity is in the range of 20% to 75%, and it is described that a wide range of porosities can be adopted. However, the invention described in Patent Literature 2 does not aim to reduce the weight of the pillar-shaped honeycomb structure, but rather aims to increase the heat capacity by suppressing the average porosity low. A pillar-shaped honeycomb structure having a high overall porosity is not specifically disclosed.

In the invention described in Patent Literature 3, although it is described that the porosity at the surface of the partition walls is within 10% of the porosity at the midpoint of the partition walls, it is insufficient to control only the relationship between the surface and the midpoint. If there is a portion with a high porosity other than the surface and the midpoint inside the partition walls, cracks tend to occur starting from that portion. In addition, since its main purpose is to reduce pressure loss, the average bulk porosity of more than 55% and the relatively large pore diameter of d50 exceeding 16 μm are required. However, the coexistence of high porosity and large pore diameter tends to adversely affect the strength.

As described above, the inventions described in Patent Literature 1 to 3 still have room for improvement in terms of achieving both weight reduction and high strength of pillar-shaped honeycomb structures. The present invention has been made in view of the above circumstances, and in one embodiment, an object of the present invention is to provide a pillar-shaped honeycomb structure having a partition wall structure suitable for achieving both weight reduction and high strength.

As a result of intensive studies to solve the above problems, the inventors of the present invention have found that, it is advantageous to control a maximum value and a minimum value of the porosity measured by an X-ray microscope in the thickness direction from one surface to the other surface of each partition wall constituting the pillar-shaped honeycomb structure. The present invention completed based on the knowledge is exemplified as below.

[1] A pillar-shaped honeycomb structure, comprising an outer peripheral side wall, and a plurality of partition walls disposed on an inner peripheral side of the outer peripheral side wall, the plurality of partition walls partitioning a plurality of cells forming flow paths from a first end surface to a second end surface, wherein an average pore diameter of the partition walls measured by a mercury porosimeter is 10 μm or less, and when a cross section of the plurality of partition walls is observed with an X-ray microscope and porosities (%) of each partition wall is measured in a thickness direction from one surface to the other surface of each partition wall, an average porosity of each partition wall is 40 to 70%, and a difference between a maximum value and a minimum value of the porosity of each partition wall is 11% or less.

[2] The pillar-shaped honeycomb structure according to [1], wherein the average pore diameter of the partition walls as measured by the mercury porosimeter is 3 to 10 μm.

[3] The pillar-shaped honeycomb structure according to [1] or [2], wherein the plurality of partition walls has an average thickness of 50 to 150 μm.

[4] The pillar-shaped honeycomb structure according to any one of [1] to [3], wherein when the average porosity (%) of each partition wall is x and the difference (%) between the maximum value and the minimum value of the porosity of each partition wall is y, the following formula (A) is established:

$$\{5.2176-0.122(x-55)\}e^{-0.283y} \geq 0.5 \qquad (A)$$

[5] The pillar-shaped honeycomb structure according to any one of [1] to [4], wherein an isostatic breaking strength is 0.5 MPa or more.

[6] The pillar-shaped honeycomb structure according to any one of [1] to [5], wherein a bulk density is 0.15 g/cc to 0.25 g/cc.

[7] The pillar-shaped honeycomb structure according to any one of [1] to [6], wherein the partition walls are made of ceramic containing 90% by mass or more of cordierite.

[8] The pillar-shaped honeycomb structure according to any one of [1] to [7], wherein a catalyst layer is provided on the surface of the partition walls.

According to one embodiment of the present invention, there is provided a pillar-shaped honeycomb structure having a partition wall structure suitable for achieving both weight reduction and high strength. Accordingly, for example, by using the pillar-shaped honeycomb structure as a catalyst carrier, it is possible to exhibit a function of increasing the catalyst temperature to the activation temperature in a short time while ensuring the desired strength.

DETAILED DESCRIPTION OF THE INVENTION

Hereinafter, embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention.

1. Pillar-Shaped Honeycomb Structure

In general, a pillar-shaped honeycomb structure comprises a pillar-shaped honeycomb structure portion including an outer peripheral side wall and partition walls disposed on the inner peripheral side of the outer peripheral side wall, the partition walls partitioning a plurality of cells forming flow paths from a first end surface to a second end surface.

Figure 1:
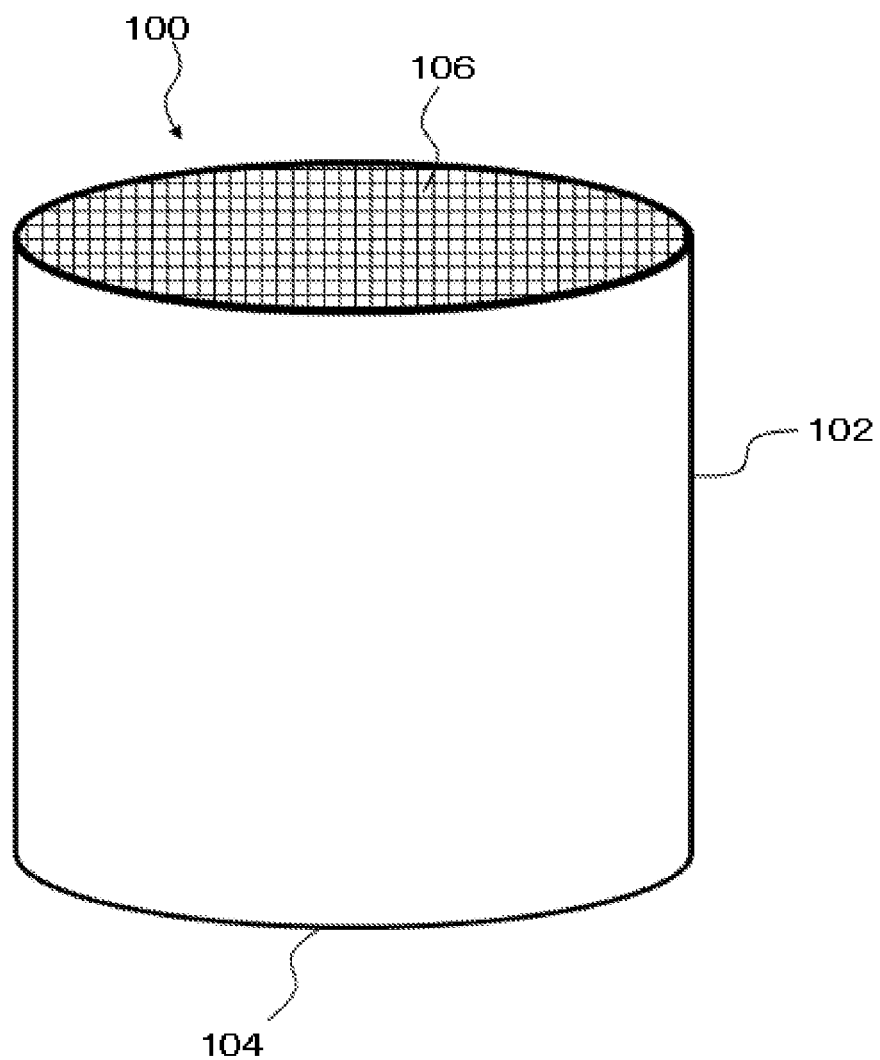
FIG. 1 is a perspective view schematically showing a wall-through type pillar-shaped honeycomb formed body.
Figure 2:
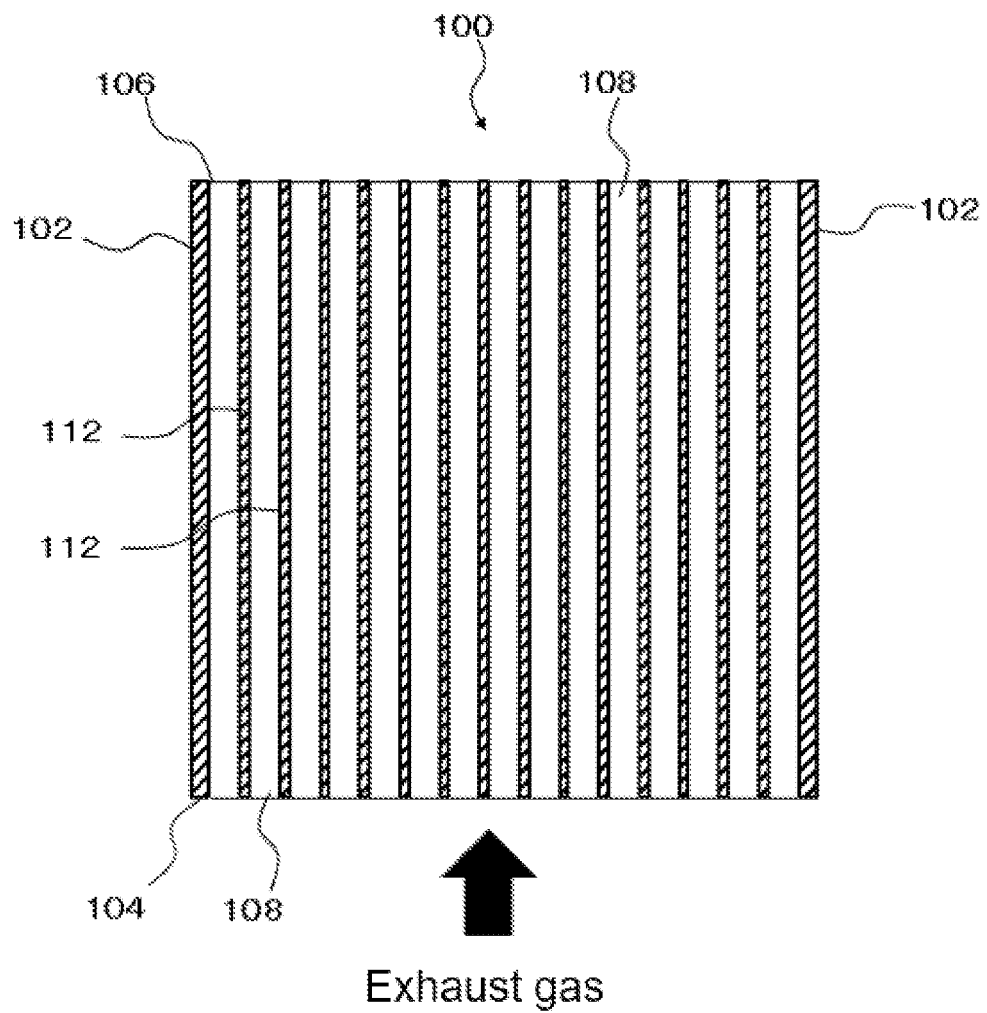
FIG. 2 is a schematic cross-sectional view of a wall-through type pillar-shaped honeycomb formed body viewed from a direction orthogonal to the direction in which the cells extend.

FIGS. 1 and 2 schematically illustrate a perspective view and a cross-sectional view of a pillar-shaped honeycomb structure 100 applicable as a wall-through type exhaust gas filter and/or catalyst carrier for automobiles, respectively. The pillar-shaped honeycomb structure 100 has an outer peripheral side wall 102, and partition walls 112 that are disposed on the inner peripheral side of the outer peripheral side wall 102 and partition a plurality of cells 108 forming flow paths for fluid from a first end surface 104 to a second end surface 106. In the pillar-shaped honeycomb structure 100, both ends of each cell 108 are open, and the exhaust gas flowing into one cell 108 from the first end surface 104 is purified while passing through the cell 108, and flows out from the second end surface 106.

Figure 3:
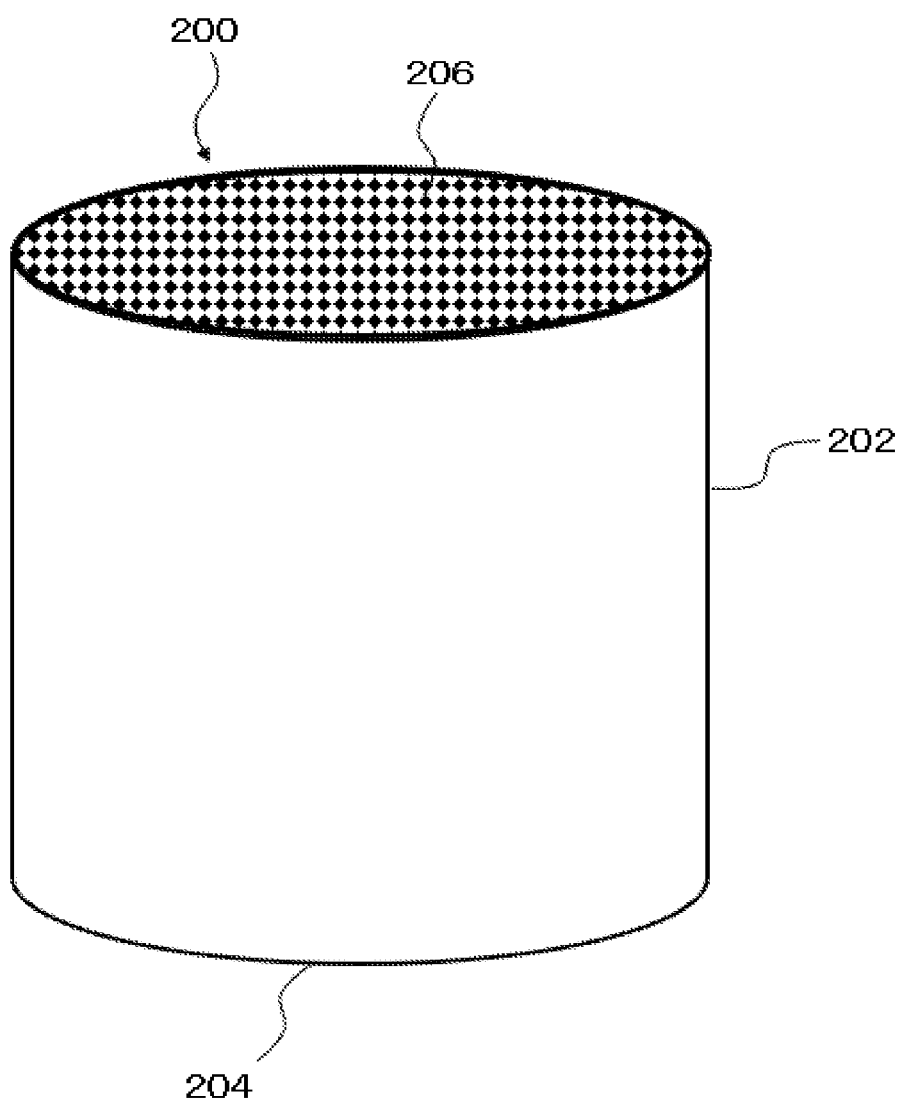
FIG. 3 is a perspective view schematically showing a wall-flow type pillar-shaped honeycomb formed body.
Figure 4:
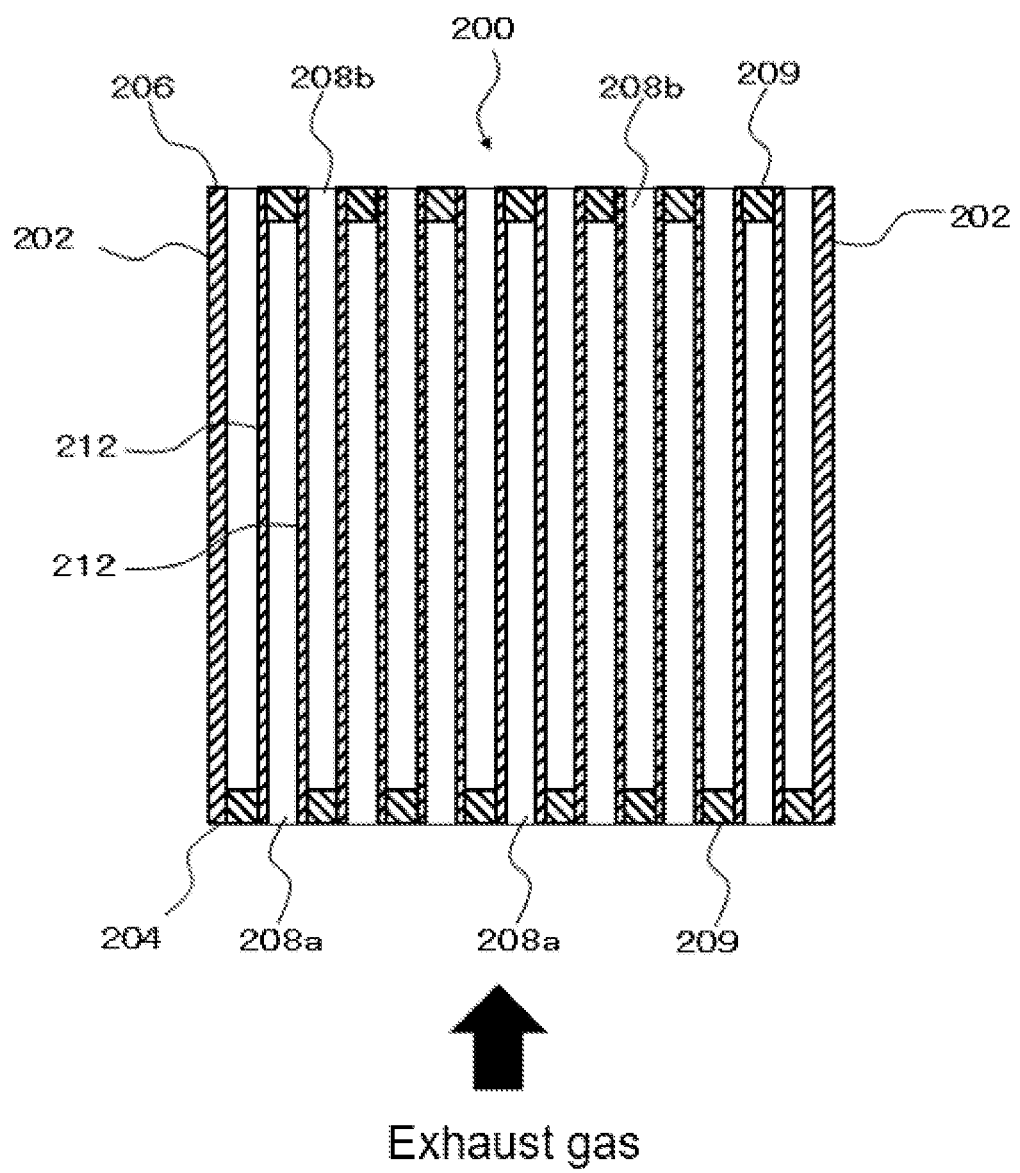
FIG. 4 is a schematic cross-sectional view of a wall-flow type pillar-shaped honeycomb formed body viewed from a direction orthogonal to the direction in which the cells extend.

FIGS. 3 and 4 illustrate a schematic perspective view and a cross-sectional view of a pillar-shaped honeycomb structure 200 applicable as a wall-flow type exhaust gas filter and/or catalyst carrier for automobiles, respectively. The pillar-shaped honeycomb structure 200 has an outer peripheral side wall 202, and partition walls 212 that are disposed on the inner peripheral side of the outer peripheral side wall 202 and partition a plurality of cells 208a, 208b forming flow paths for fluid from a first end surface 204 to a second end surface 206.

In the pillar-shaped honeycomb structure 200, the plurality of cells 208a, 208b can be divided into a plurality of first cells 208a provided on the inner peripheral side of the outer peripheral side wall 202, each extending from the first end surface 204 to the second end surface 206, opening on the first end surface 204 and having a sealing portion 209 on the second end surface 206, and a plurality of second cells 208b provided on the inner peripheral side of the outer peripheral side wall 202, each extending from the first end surface 204 to the second end surface 206, having a sealing portion 209 on the first end surface 204 and opening on the second end surface 206. Further, in the pillar-shaped honeycomb structure 200, the first cells 208a and the second cells 208b are alternately arranged adjacent to each other with the partition walls 212 interposed therebetween.

When exhaust gas containing particulate matter (PM) such as soot is supplied to the first end surface 204 on the upstream side of the pillar-shaped honeycomb structure 200, the exhaust gas is introduced into the first cells 208a and proceeds downstream in the first cells 208a. Since the first cells 208a have the sealing portion 209 on the second end surface 206 on the downstream side, the exhaust gas penetrates the partition walls 212 that partition the first cells 208a and the second cells 208b, and flows into the second cells 208b. Since the particulate matter (PM) cannot pass through the partition walls 212, it is captured and deposited in the first cells 208a. After the particulate matter (PM) is removed, the clean exhaust gas that has flowed into the second cells 208b proceeds downstream in the second cells 208b and flows out from the second end surface 206 on the downstream side.

The shape of the end surfaces of the pillar-shaped honeycomb structures 100, 200 is not limited, and it may be, for example, a round shape such as a circle, an ellipse, a race track shape, or a long circle shape, or a polygon such as a triangle or a quadrangle. Other irregular shapes are also possible. The pillar-shaped honeycomb structures 100, 200 shown in the figures have circular end surfaces and are cylindrical as a whole.

The height of the pillar-shaped honeycomb structure (the length from the first end surface to the second end surface) is not particularly limited and may be appropriately set according to the application and required performance. There is no particular limitation on the relationship between the height of the pillar-shaped honeycomb structure and the maximum diameter of each end surface (referring to the maximum length of the diameters passing through the center of gravity of each end surface of the pillar-shaped honeycomb structure). Therefore, the height of the pillar-shaped honeycomb structure may be longer than the maximum diameter of each end surface, or the height of the pillar-shaped honeycomb structure may be shorter than the maximum diameter of each end surface.

Examples of the material constituting the partition walls and the outer peripheral side wall of the pillar-shaped honeycomb structure include, but are not limited to, ceramics. As for the ceramics, mention can be made to cordierite, mullite, zirconium phosphate, aluminum titanate, silicon carbide (SiC), silicon-silicon carbide composite (for example, Si-bonded SiC), cordierite-silicon carbide composite, zirconia, spinel, indialite, sapphirine, corundum, titania, silicon nitride, and the like. Further, for these ceramics one type may be contained alone, and two or more types may be contained.

In a preferred embodiment, the partition walls are formed by ceramics containing 90% by mass or more of cordierite. This means that, in 100% by mass of the material constituting the partition walls, the mass ratio of cordierite ($2MgO \cdot 2Al_2O_3 \cdot 5SiO_2$) is 90% by mass or more. In 100% by mass of the material constituting the partition walls, the mass ratio of cordierite is more preferably 95% by mass or more, and even more preferably 99% by mass or more. It is also possible that cordierite accounts for 100% by mass of the material constituting the partition walls, except for unavoidable impurities.

Figure 5:
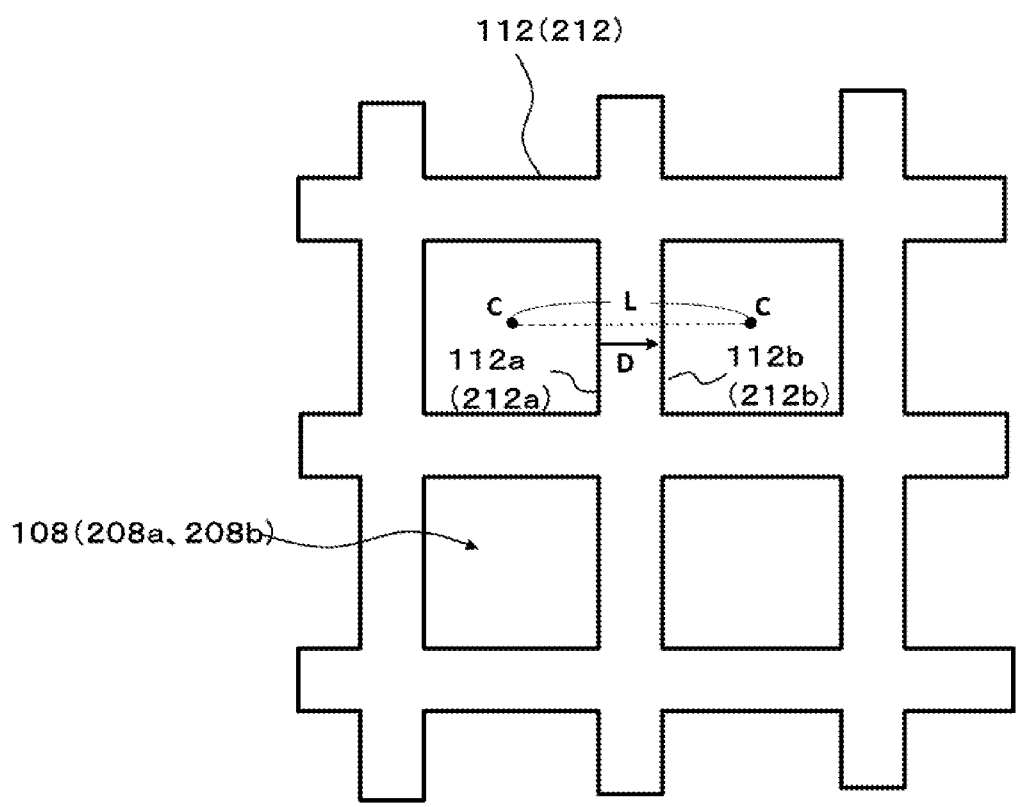
FIG. 5 is a schematic partially enlarged view of a pillar-shaped honeycomb structure observed in a cross-section orthogonal to the direction in which the cells extend.

The average thickness of the partition walls in the pillar-shaped honeycomb structure is preferably 50 μm or more, more preferably 60 μm or more, and even more preferably 70 μm or more, from the viewpoint of ensuring the strength. Further, the average thickness of the partition walls is preferably 150 μm or less, more preferably 130 μm or less, and even more preferably 100 μm or less, from the viewpoint of suppressing the pressure loss. FIG. 5 shows a schematic partially enlarged view when the partition walls 112 (212) of the pillar-shaped honeycomb structure 100 (200) are observed in a cross-section orthogonal to the direction in which the cells 108 (208a, 208b) extend. In the present specification, the thickness of a partition wall refers to a crossing length of a line segment L that crosses the partition wall when the centers of gravity C of adjacent cells are connected by this line segment in a cross-section orthogonal to the direction in which the cells extend (the height direction of the honeycomb structure). A thickness direction D of the partition wall indicates the direction parallel to the line segment L. The average thickness of the partition walls refers to the average value of the thickness of all the partition walls.

In the pillar-shaped honeycomb structure, the partition walls can be made porous. When a cross section of the plurality of partition walls 112 (212) of the pillar-shaped honeycomb structure is observed with an X-ray microscope and the porosities (%) of each partition wall 112 (212) is measured in the thickness direction D from one surface 112*a* (212*a*) to the other surface 112*b* (212*b*), the lower limit of the average porosity of each partition wall is preferably 40% or more, more preferably 45% or more, and even more preferably 50% or more, from the viewpoint of reducing the weight of the pillar-shaped honeycomb structure. The upper limit of the average porosity of each partition wall is preferably 70% or less, more preferably 65% or less, and even more preferably 60% or less. Therefore, the average porosity of each partition wall is, for example, preferably 40 to 70%, more preferably 45 to 65%, even more preferably 50 to 60%, from the viewpoint of ensuring the strength of the pillar-shaped honeycomb structure.

In addition, when a cross section of the plurality of partition walls 112 (212) of the pillar-shaped honeycomb structure is observed with an X-ray microscope and the porosities (%) of each partition wall 112 (212) is measured in the thickness direction D from one surface 112*a* (212*a*) to the other surface 112*b* (212*b*), the difference between the maximum value and the minimum value of the porosity of each partition wall is preferably 11% or less, more preferably 9% or less, even more preferably 7% or less, and most preferably 5% or less. Although there is no lower limit to the difference between the maximum value and the minimum value of the porosity of each partition wall, it is usually 1% or more, or typically 3% or more, for the ease of manufacture. Therefore, the difference between the maximum value and the minimum value of the porosity of each partition wall is, for example, preferably 1 to 11%, more preferably 1 to 9%, even more preferably 1 to 7%, and even more preferably 1 to 5%.

The observation method of each partition wall with an X-ray microscope, the measurement method of the average porosity of each partition wall, and the measurement method of the difference between the maximum value and the minimum value of the porosity of each partition, are carried out according to the following procedures.

First, for each of the vicinity of the first end surface, the vicinity of the center in the height direction, and the vicinity of the second end surface of the pillar-shaped honeycomb structure, partition wall samples (cross-sectional size (length 20 mm×width 2 mm)×depth 0.3 mm) with exposed cross-sections orthogonal to the direction in which the cells extend are taken from the vicinity of the central axis, the vicinity of the midpoint in the radial direction (the vicinity of the center between the central axis and the outer peripheral side wall), and the vicinity of the outer peripheral side wall (not including the outer peripheral side wall). Next, after observing the cross-section of each sample with an X-ray microscope and performing a CT scan, the obtained three-dimensional cross-sectional image is binarized based on the brightness and divided into a large number of voxels of the void portions and the base material portions (size of one voxel=a cube with the length of partition wall in the wall surface direction (Y direction): 0.8 μm; the length of partition wall in the thickness direction (X direction): 0.8 μm; the length of partition wall in the depth direction (Z direction): 0.8 μm).

The measurement condition of the X-ray microscope is 4 times magnification.

The binarization process is performed by Otsu's binarization method.

Figure 6:
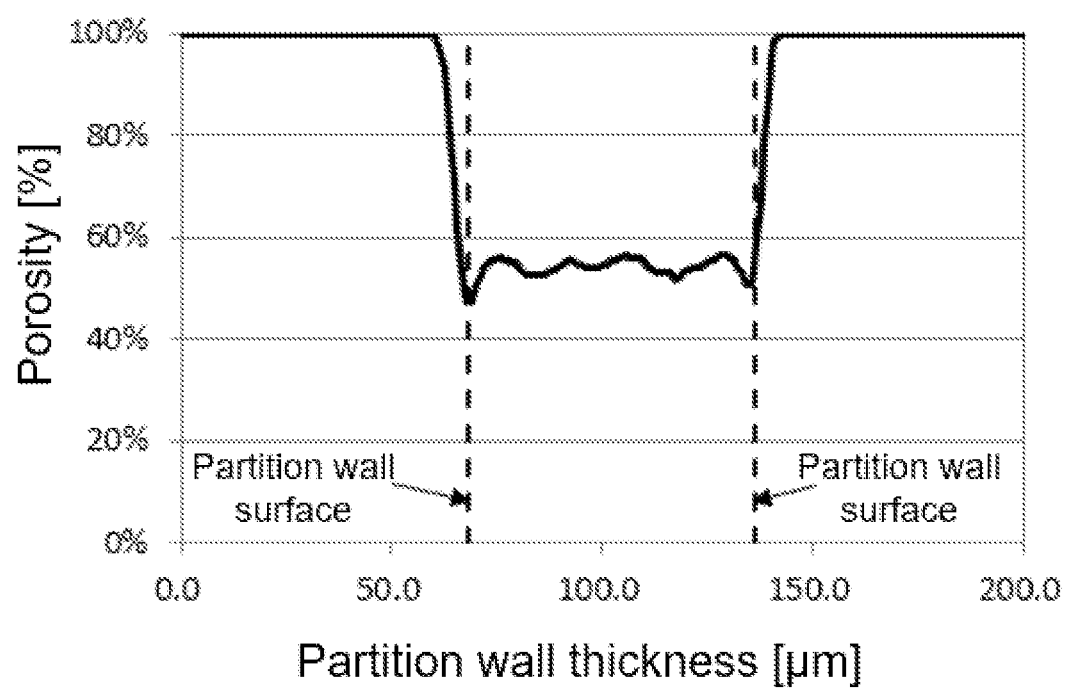
FIG. 6 is an example of a porosity profile when the porosities (%) are measured along the thickness direction D of a partition wall from one surface to the other surface.

Then, for a predetermined region (the length of the partition wall in the wall surface direction (Y direction): 340 μm; the length of the partition wall in the thickness direction (X direction): the length that includes the entire thickness and has a void portion of 50 μm or more on both sides of the partition wall; the length of the partition wall in the depth direction (Z direction): 300 μm) of any one partition wall on the three-dimensional cross-sectional image, based on the binarized voxel data, a porosity (%) profile is obtained every 0.8 μm along the thickness direction (X direction) of the partition wall from one surface to the other surface (see FIG. 6). The porosity of the partition wall having a thickness of 0.8 μm is calculated for the 0.8 μm-thick region (the length of the partition wall in the wall surface direction (Y direction): 340 μm; the length of the partition wall in the thickness direction (X direction): 0.8 μm; the length of the partition wall in the depth direction (Z direction): 300 μm) according to the formula: porosity=(number of voxels of void portions)/(total number of voxels in this region)×100 (%). By performing the calculation for the entire predetermined regions every 0.8 μm from the left end of the image, a profile of porosity (%) at intervals of 0.8 μm along the thickness direction (X direction) of the partition wall from one surface to the other surface is obtained.

Figure 7:
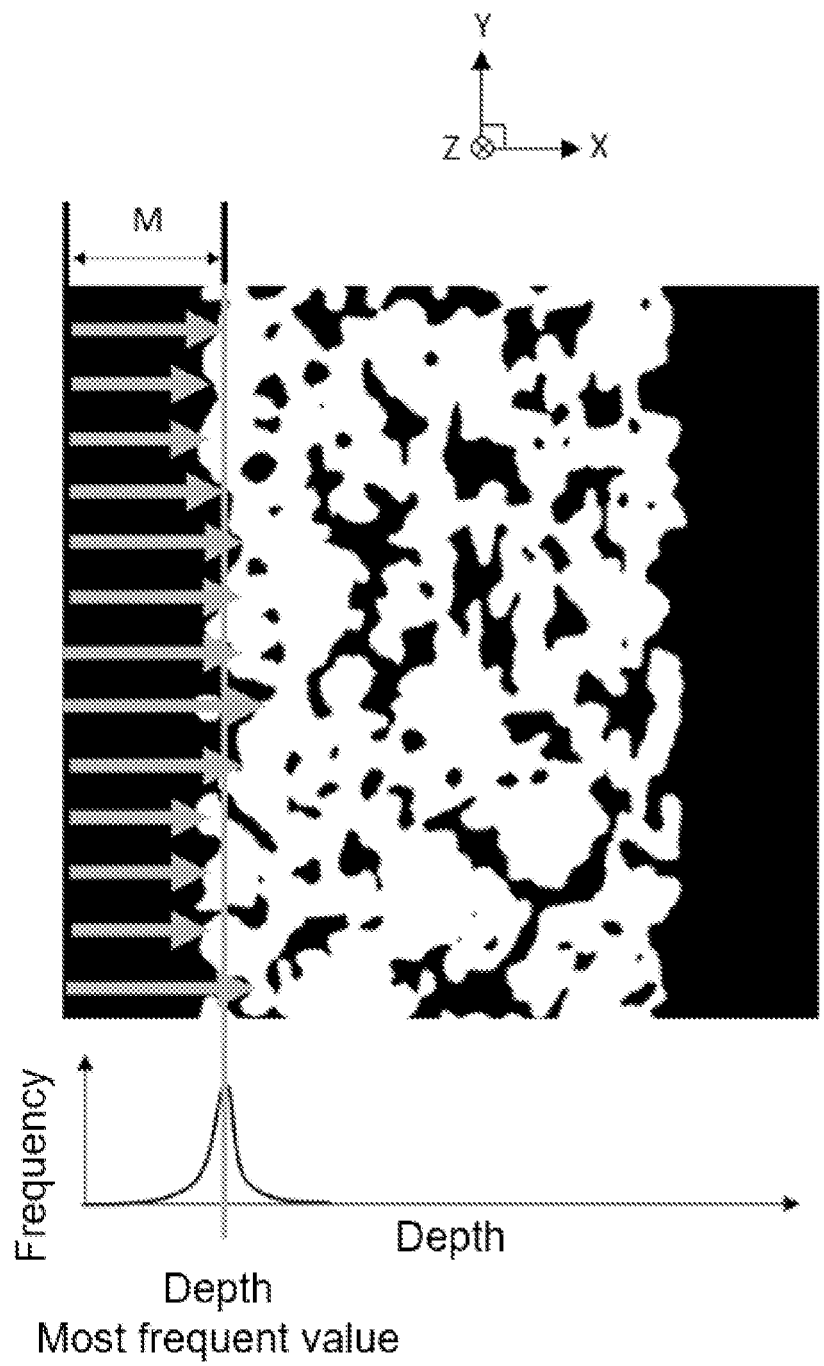
FIG. 7 is a conceptual diagram explaining a method of specifying the position of one surface of a partition wall on a cross-sectional image.

At this time, as shown in FIG. 7, the position of one surface of the partition wall is defined as the position of the most frequent value when the distance M in the thickness direction D (X direction) is measured from a line segment parallel to the wall surface direction of the partition wall to one surface of the partition wall to be measured. The distance M is measured at intervals of 0.8 μm over a length of 340 μm in the wall surface direction (Y direction perpendicular to the thickness direction (X direction)) of the partition wall on the binarized image. The position of the other surface of the partition wall is similarly specified.

In this way, the porosity profile of any one partition wall is obtained from each sample, and the average porosity of the partition wall and the difference between the maximum value and the minimum value of the porosity of the partition wall are obtained from the profile. Then, the average value of a total of 9 samples is defined as the "average porosity of each partition wall" and the "difference between the maximum value and the minimum value of the porosity of each partition wall" in the pillar-shaped honeycomb structure as the target of the measurement.

One of the indications of the mechanical strength of a pillar-shaped honeycomb structure is the isostatic breaking strength. In measuring the isostatic breaking strength of a pillar-shaped honeycomb structure, a test is conducted by immersing the pillar-shaped honeycomb structure in water in a pressure vessel and gradually increasing the water pressure such that isotropic pressure is applied to the pillar-shaped honeycomb structure. As the water pressure in the pressure vessel gradually increases, the partition walls and outer peripheral side walls of the pillar-shaped honeycomb structure finally break. The pressure value (breaking strength) at which breakage occurs is the isostatic breaking strength. The isostatic breaking strength is measured based on the automobile standard (JASO M505-87) issued by the Society of Automotive Engineers of Japan.

When applying the pillar-shaped honeycomb structure as an automobile exhaust gas filter and/or a catalyst carrier, the lower limit of the isostatic breaking strength is preferably 0.5 MPa or more, more preferably 1.0 MPa or more, and even more preferably 1.5 MPa or more. Although the upper limit of the isostatic breaking strength is not particularly set, it is usually 3.0 MPa or less, and typically 2.5 MPa or less.

Assuming that the average porosity of each partition wall is constant, the smaller the difference between the maximum value and the minimum value of the porosity of each partition wall is, the higher the isostatic breaking strength of the pillar-shaped honeycomb structure is. For example, assuming the average porosity of each partition wall is 55%, when the isostatic breaking strength of the pillar-shaped honeycomb structure is measured by varying the difference between the maximum value and the minimum value of the porosity (hereinafter also referred to as "porosity variation") in each partition wall, by plotting the porosity variation (%) (Y) on the horizontal axis and the isostatic breaking strength (MPa) (S) on the vertical axis on two-dimensional coordinates, an approximation formula of $S=5.2176e^{-0.283Y}$ is generally established. The approximation formula has particularly high accuracy when the partition walls are made of ceramics containing 90% by mass or more of cordierite, and the average thickness of the partition walls is 2.3 to 2.9 mils (58 to 74 µm), and the cell density is 730 to 770 cells/square inch (113 to 119 cells/cm$^2$).

When the influence of the average porosity of each partition wall is taken into account in the above approximation formula, empirically, the following formula is generally established among the average porosity (%) (x) of each partition wall, the difference between maximum value and the minimum value of the porosity (porosity variation (%)) (y) of each partition wall, and the isostatic breaking strength (MPa) (S):

$$S=\{5.2176-0.122(x-55)\}e^{-0.283y}$$

Accordingly, it is preferable that formula (A) be established, more preferably that formula (B) be established, and even more preferably that formula (C) be established.

$$\{5.2176-0.122(x-55)\}e^{-0.283y} \geq 0.5 \quad (A)$$

$$\{5.2176-0.122(x-55)\}e^{-0.283y} \geq 1.0 \quad (B)$$

$$\{5.2176-0.122(x-55)\}e^{-0.283y} \geq 1.5 \quad (C)$$

The lower limit of the average pore diameter of the partition walls is preferably 3 µm or more from the viewpoint of carrying a catalyst. In addition, the upper limit of the average pore diameter of the partition walls is preferably 10 µm or less, more preferably 8 µm or less, and even more preferably 6 µm or less, from the viewpoint of preventing the catalyst from penetrating into the base material. Therefore, the average pore diameter of the partition walls is, for example, preferably 3 to 10 µm, more preferably 3 to 8 µm, and even more preferably 3 to 6 µm.

In the present specification, the average pore diameter of the partition walls refers to the median diameter (D50) of the pore diameters measured by the mercury intrusion method specified in JIS R1655:2003 using a mercury porosimeter. The mercury intrusion method is a method of applying equal pressure while a sample is immersed in mercury in a vacuum state, intruding mercury into the sample while gradually increasing the pressure, and calculating the pore size distribution from the pressure and the volume of mercury intruded into the pores. When the pressure is gradually increased, mercury is intruded in order from the pores with the large diameter, and the cumulative volume of mercury increases, and eventually, when all the pores are filled with mercury, the cumulative volume reaches equilibrium. The cumulative volume at this time is the total pore volume (cm$^3$/g), and the pore diameter (D50) at the time when 50% of the total pore volume of mercury is intruded is defined as the average pore diameter.

When obtaining the average pore diameter of partition walls, for each of the vicinity of the first end surface, the vicinity of the center in the height direction, and the vicinity of the second end surface of the pillar-shaped honeycomb structure, partition wall samples (cross-sectional size (length 10 mm×width 10 mm)×depth 10 mm) with exposed cross-sections orthogonal to the direction in which the cells extend are taken from the vicinity of the central axis, the vicinity of the midpoint in the radial direction (the vicinity of the center between the central axis and the outer peripheral side wall), and the vicinity of the outer peripheral side wall (not including the outer peripheral side wall), and the average pore diameter of each sample is measured. Then, the average value of all 9 samples in total is taken as the "average pore diameter of the partition walls" of the pillar-shaped honeycomb structure as the target of measurement.

The opening shape of the cells in the cross-section orthogonal to the direction in which the cells extend is not limited, and is preferably a quadrangle, a hexagon, an octagon, or a combination thereof. Among these, a square and a hexagon are preferred. By making the opening shape of the cells as described above, the pressure loss when exhaust gas is allowed to flow through the honeycomb structure is reduced, and the purification performance when it is used as a filter is excellent. Also, by making the opening shape of the cells as described above, the pressure loss when fluid is allowed to flow through the pillar-shaped honeycomb structure is reduced, and the purification performance of the catalyst is excellent.

The cell density (number of cells per unit cross-sectional area) of the pillar-shaped honeycomb structure is not particularly limited, and may be, for example, 6 to 2000 cells/square inch (0.9 to 311 cells/cm$^2$), more preferably 50 to 1000 cells/square inch (7.8 to 155 cells/cm$^2$), particularly preferably 100 to 600 cells/square inch (15.5 to 92.0 cells/cm$^2$). Here, the cell density is calculated by dividing the number of cells in the pillar-shaped honeycomb structure by the area of one end surface of the pillar-shaped honeycomb structure excluding the outer peripheral side wall.

The bulk density of the pillar-shaped honeycomb structure is desirably low as long as the desired strength is ensured. The bulk density of the pillar-shaped honeycomb structure is preferably 0.15 g/cc to 0.25 g/cc, more preferably 0.15 g/cc to 0.23 g/cc, and even more preferably 0.15 g/cc to 0.20 g/cc. In the present specification, the bulk density of the pillar-shaped honeycomb structure is measured by the formula: bulk density (g/cc)=mass (g) of the pillar-shaped honeycomb structure/volume (cc) based on the external dimensions of the pillar-shaped honeycomb structure.

When the pillar-shaped honeycomb structure is used as a catalyst carrier, a desired catalyst layer can be formed on the surface of the partition walls. The catalyst is not limited, and mentioned can be made to an oxidation catalyst (DOC) for raising the exhaust gas temperature by oxidative combustion of hydrocarbons (HC) and carbon monoxide (CO), a PM combustion catalyst that assists the combustion of PM such as soot, an SCR catalyst and an NSR catalyst for removing nitrogen oxides (NOx), and a three-way catalyst capable of simultaneously removing hydrocarbons (HC), carbon monoxide (CO) and nitrogen oxides (NOx). The catalyst can appropriately contain, for example, precious metals (Pt, Pd, Rh, and the like), alkali metals (Li, Na, K, Cs, and the like), alkaline earth metals (Mg, Ca, Ba, Sr, and the like), rare earths (Ce, Sm, Gd, Nd, Y, La, Pr, and the like), transition metals (Mn, Fe, Co, Ni, Cu, Zn, Sc, Ti, Zr, V, Cr, and the like) and the like.

2. Method for Manufacturing a Pillar-Shaped Honeycomb Structure

A method for manufacturing a pillar-shaped honeycomb structure will be exemplified below. First, a raw material composition containing a ceramic raw material, a dispersion medium, a pore-forming agent and a binder is kneaded to form a green body. Then, by extruding the green body and drying it, a pillar-shaped honeycomb formed body can be manufactured. Additives such as a dispersant can be added to the raw material composition as needed. In extrusion molding, a die having a desired overall shape, cell shape, partition wall thickness, cell density and the like can be used.

In the drying step, conventionally known drying methods such as hot gas drying, microwave drying, dielectric drying, reduced pressure drying, vacuum drying, and freeze drying can be used. Among these, a drying method that combines hot gas drying with microwave drying or dielectric drying is preferable in that the entire formed body can be dried quickly and uniformly. The sealing portions can be formed by forming the sealing portions at predetermined positions on both end surfaces of the dried honeycomb formed body and then drying the sealing portions.

The ceramic raw material is a raw material for a portion of a metal oxide, a metal, or the like that remains after firing and constitutes the skeleton of the pillar-shaped honeycomb formed body (pillar-shaped honeycomb structure) after firing as ceramics. The ceramic raw material can be provided, for example, in the form of powder. Examples of the ceramic raw material include raw materials for obtaining ceramics such as cordierite, mullite, zircon, aluminum titanate, silicon carbide, silicon nitride, zirconia, spinel, indialite, sapphirine, corundum, and titania. Specifically, examples include, but are not limited to, silica, talc, alumina, kaolin, serpentine, pyrophyllite, bluesite, boehmite, mullite, magnesite, and aluminum hydroxide. As the ceramic raw material, one type may be used alone, or two or more types may be used in combination. From the viewpoint of reducing the porosity variation while miniaturizing the pore diameter, it is preferable to use fine silica particles having a median diameter (D50) close to the target average pore diameter of the partition walls, for example, 2 to 7 μm. Further, it is also preferable to use fine particles for other ceramic raw materials as well.

In the case of filter applications such as DPF and GPF, cordierite can be preferably used as the ceramics. In this case, a cordierite-forming raw material can be used as the ceramic raw material. A cordierite-forming raw material is a raw material that becomes cordierite by firing. It is desirable that the cordierite-forming raw material has a chemical composition of alumina ($Al_2O_3$) (including the amount of aluminum hydroxide that converts to alumina): 30 to 45% by mass, magnesia (MgO): 11 to 17% by mass, and silica ($SiO_2$): 42 to 57% by mass.

Examples of the dispersion medium include water or a mixed solvent of water and an organic solvent such as alcohol, and water can be particularly preferably used.

The pore-forming agent is not particularly limited as long as it becomes pores after firing, and examples thereof include wheat flour, starch, foam resin, water-absorbing resin, silica gel, carbon (for example, graphite, coke), ceramic balloon, polyethylene, polystyrene, polypropylene, nylon, polyester, acrylic, phenol, and the like. As the pore-forming agent, one type may be used alone, or two or more types may be used in combination. The content of the pore-forming agent is preferably 0.5 parts by mass or more, more preferably 2 parts by mass or more, and even more preferably 3 parts by mass or more with respect to 100 parts by mass of the ceramic raw material, from the viewpoint of increasing the porosity of the honeycomb structure. The content of the pore-forming agent is preferably 10 parts by mass or less, more preferably 7 parts by mass or less, and even more preferably 4 parts by mass or less with respect to 100 parts by mass of the ceramic raw material, from the viewpoint of ensuring the strength of the honeycomb structure. From the viewpoint of reducing the porosity variation while miniaturizing the pore diameter, it is preferable to use a fine pore-forming agent having a median diameter (D50) close to the target average pore diameter of the partition walls, for example, 5 to 25 μm.

Examples of the binder include organic binders such as methyl cellulose, hydroxypropyl methyl cellulose, hydroxyethyl cellulose, carboxymethyl cellulose, polyvinyl alcohol, and the like. In particular, it is preferable to use methyl cellulose and hydroxypropyl methyl cellulose in combination. Further, the content of the binder is preferably 4 parts by mass or more, more preferably 5 parts by mass or more, and even more preferably 6 parts by mass or more with respect to 100 parts by mass of the ceramic raw material, from the viewpoint of increasing the strength of the honeycomb formed body before firing. The content of the binder is preferably 9 parts by mass or less, more preferably 8 parts by mass or less, and even more preferably 7 parts by mass or less with respect to 100 parts by mass of the ceramic raw material, from the viewpoint of suppressing the occurrence of crack due to abnormal heat generation in the firing process. As the binder, one type may be used alone, or two or more types may be used in combination.

As the dispersant, ethylene glycol, dextrin, fatty acid soap, polyether polyol and the like can be used. As the dispersant, one type may be used alone, or two or more types may be used in combination. The content of the dispersant is preferably 0 to 2 parts by mass with respect to 100 parts by mass of the ceramic raw material.

The pillar-shaped honeycomb formed body may have both ends of all cells opened, as shown in FIG. 1 and FIG. 2. Further, the pillar-shaped honeycomb formed body may have a cell structure in which one end of the cells are sealed alternately, as shown in FIG. 3 and FIG. 4. The method for sealing the end surface of the pillar-shaped honeycomb formed body is not particularly limited, and a known method can be adopted.

The material of the sealing portions is not particularly limited, but ceramics is preferable from the viewpoint of strength and heat resistance. The ceramics preferably comprises at least one selected from the group consisting of cordierite, mullite, zircon, aluminum titanate, silicon carbide, silicon nitride, zirconia, spinel, indialite, sapphirine, corundum, and titania. The sealing portions are preferably formed of a material comprising 50% by mass or more of these ceramics in total, and more preferably formed of a material comprising 80% by mass or more of these ceramics in total. It is even more preferable that the sealing portions have the same material composition as the main body portion of the honeycomb formed body because the expansion coefficient at the time of firing can be made the same and the durability can be improved.

A method of forming the sealing portion will be exemplified. A sealing slurry is stored in a storage container. Next, a mask having openings at positions corresponding to the cells on which the sealing portions are to be formed is attached to one of the end surfaces. The end surface to which the mask is attached is immersed in the storage container, and the openings are filled with a sealing slurry so that sealing portions are formed. The sealing portions can be formed on the other end surface in the same manner.

A pillar-shaped honeycomb structure can be manufactured by performing a degreasing step and a firing step on the dried pillar-shaped honeycomb formed body. As the conditions of the degreasing step and the firing step, known conditions may be adopted according to the material composition of the honeycomb formed body, and although no particular explanation is required, specific examples of the conditions are given below.

The degreasing step will be described. The combustion temperature of the binder is about 200° C., and the combustion temperature of the pore-forming agent is about 300 to 1000° C. Therefore, the degreasing step may be carried out by heating the honeycomb formed body in the range of about 200 to 1000° C. The heating time is not particularly limited, but is usually about 10 to 100 hours. The honeycomb formed body after the degreasing step is called a calcined body.

The firing step depends on the material composition of the honeycomb formed body, but can be performed, for example, by heating the calcined body to 1350 to 1600° C. and maintaining the temperature for 3 to 10 hours.

EXAMPLES

Test Numbers 1 to 8

1. Manufacture of Honeycomb Structure

According to Test numbers, a cordierite-forming raw material, a pore-forming agent A, a pore-forming agent B, a binder, a dispersant, and a dispersion medium were added, mixed and kneaded to prepare a green body, according to the formulations shown in Table 1. Talc, kaolin, alumina, aluminum hydroxide, silica A and silica B were used as cordierite-forming raw materials. Silica A and silica B had different median diameters (D50). Pore-forming agent A and pore-forming agent B also had different median diameters (D50). Water was used as the dispersion medium, a polyacrylic acid-based polymer was used as the pore-forming agent, hydroxypropylmethylcellulose was used as the binder, and a fatty acid soap was used as the dispersant. The median diameter (D50) of each material shown in Table 1 is a volume-based value measured by a laser diffraction particle size distribution analyzer (Model LA960 manufactured by HORIBA, Ltd.).

TABLE 1

| Test Number | | Cordierite-forming raw material | | | | | | Pore-forming agent | | Binder | Dispersant | Water (dispersion medium) |
|---|---|---|---|---|---|---|---|---|---|---|---|---|
| | | Talc | Kaolin | Alumina | Aluminum hydroxide | Silica A | Silica B | A | B | | | |
| | | | | | | Median diameter D50 (μm) | | | | | | |
| | | 10.0 | 5.0 | 5.0 | 3.0 | 5.0 | 10.0 | 10 | 25 | — | — | — |
| 1 | Parts by mass | 40 | 10 | 20 | 10 | 10 | 10 | 0.0 | 2.5 | 8.0 | 1.0 | 60 |
| 2 | | 40 | 10 | 20 | 10 | 15 | 5 | 0.0 | 3.5 | 8.0 | 1.0 | 58 |
| 3 | | 40 | 0 | 25 | 10 | 25 | 0 | 0.0 | 4.5 | 8.0 | 1.0 | 62 |
| 4 | | 40 | 0 | 25 | 10 | 25 | 0 | 0.0 | 4.0 | 8.0 | 1.0 | 57 |
| 5 | | 40 | 0 | 25 | 10 | 25 | 0 | 4.0 | 0.0 | 8.0 | 1.0 | 57 |
| 6 | | 40 | 10 | 15 | 15 | 20 | 0 | 3.5 | 0.0 | 8.0 | 1.0 | 62 |
| 7 | | 40 | 0 | 25 | 10 | 25 | 0 | 0.0 | 1.5 | 8.0 | 1.0 | 40 |
| 8 | | 40 | 0 | 25 | 10 | 25 | 0 | 0.0 | 6.5 | 8.0 | 1.0 | 74 |

The green body was charged into an extrusion molding machine and horizontally extruded through a predetermined die to obtain a cylindrical honeycomb formed body. After dielectric drying and hot gas drying of the obtained honeycomb formed body, both end surfaces were cut to obtain a cylindrical honeycomb formed body having a predetermined size.

The cylindrical honeycomb formed body thus obtained was degreased by heating at 200° C. for 8 hours in an air atmosphere, and further fired at 1430° C. for 4 hours in an air atmosphere to obtain a pillar-shaped honeycomb structure. A number of pillar-shaped honeycomb structures for each Test number was manufactured as required for the following measurements. The specifications of the obtained pillar-shaped honeycomb structure were as follows.

Overall shape: cylindrical with a diameter of 118 mm and a height of 91 mm
Cell shape in the cross-section perpendicular to the flow direction of the cells: square
Cell density (number of cells per unit cross-sectional area): 750 cells/square inch
Average thickness of the partition walls: 2.6 mil (66 μm) (nominal value based on the specifications of the die)

2. Measurement of Porosity Profile of Partition Walls

For each pillar-shaped honeycomb structure obtained by the above-described manufacturing method, the porosity profile of the partition walls was measured using an X-ray microscope (Model Xradia 520 Versa manufactured by Zeiss) according to the method described above. The average porosity of each partition wall, and the difference between the maximum value and the minimum value of the porosity (porosity variation) of each partition wall were determined. The results are shown in Table 2.

3. Measurement of Average Pore Diameter of Partition Walls

For each pillar-shaped honeycomb structure obtained by the above manufacturing method, the average pore diameter of the partition walls was determined using Autopore 9505 manufactured by Micromeritics Instruments Corporation in accordance with the method described above. The results are shown in Table 2.

4. Bulk Density

The bulk density of each pillar-shaped honeycomb structure obtained by the above manufacturing method was determined according to the method described above. The results are shown in Table 2.

5. Measurement of Isostatic Breaking Strength

The isostatic breaking strength of each pillar-shaped honeycomb structure obtained by the above manufacturing method was measured based on the automobile standard (JASO M505-87) issued by the Society of Automotive Engineers of Japan. The results are shown in Table 2.

TABLE 2

|  | Test number | | | | | | | |
| --- | --- | --- | --- | --- | --- | --- | --- | --- |
|  | 1 | 2 | 3 | 4 | 5 | 6 | 7 | 8 |
| Average porosity of each partition wall (%) | 55 | 55 | 55 | 55 | 55 | 55 | 40 | 70 |
| Porosity variation of each partition wall (%) | 12.1 | 9.1 | 7.0 | 7.0 | 4.9 | 4.3 | 7.0 | 7.0 |
| Average pore diameter of partition walls (μm) | 4.9 | 5.7 | 5.4 | 5.0 | 4.5 | 4.4 | 4.0 | 8.0 |
| Bulk density (g/cc) | 0.19 | 0.19 | 0.19 | 0.19 | 0.19 | 0.19 | 0.25 | 0.15 |
| Isostatic breaking strength (MPa) | 0.18 | 0.26 | 0.86 | 1.17 | 0.98 | 1.54 | 0.97 | 0.54 |

6. Discussion

Figure 8:
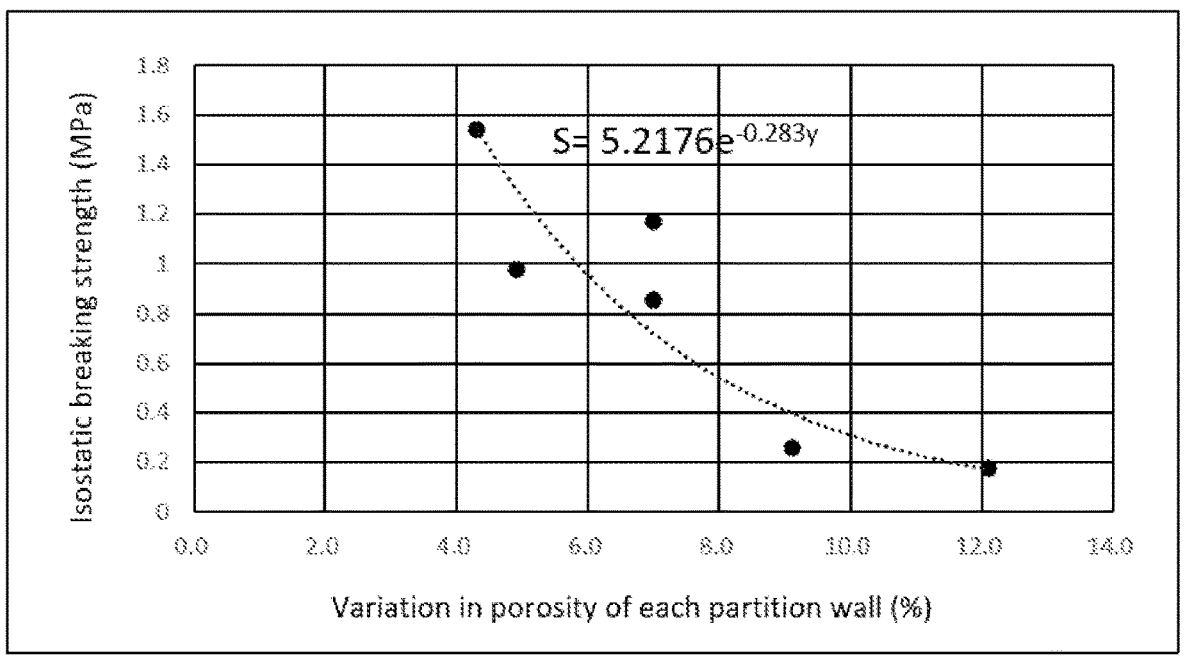
FIG. 8 shows the result of plotting the porosity variation (Y) on the horizontal axis and the isostatic breaking strength (S) on the vertical axis on two-dimensional coordinates for the pillar-shaped honeycomb structures of Test Numbers 1 to 6.

Among the pillar-shaped honeycomb structures obtained by the above manufacturing method, Test numbers 1 to 6, in which the "average porosity of each partition wall" was 55%, had differences in "the difference between the maximum value and the minimum value of the porosity of each partition wall" (porosity variation). For Test numbers 1 to 6, by plotting the porosity variation (Y) on the horizontal axis and the isostatic breaking strength (S) on the vertical axis on two-dimensional coordinates, and obtaining an approximate curve by the method of exponential approximation, $S=5.2176e^{-0.283Y}$ was obtained (FIG. 8).

Further, the isostatic breaking strengths (S) of the pillar-shaped honeycomb structures of Test number 7 with an average porosity of 40% and Test number 8 with an average porosity of 70% were predicted according to the following formula, and were 0.97 MPa and 0.47 MPa, respectively. Therefore, it can be understood that Test number 7 with an average porosity of 40% and Test number 8 with an average porosity of 70% are in good approximation with the isostatic breaking strength (S) predicted by the following formula.

$$S=\{5.2176-0.122(x-55)\}e^{-0.283y}$$

DESCRIPTION OF REFERENCE NUMERALS

100: Pillar-shaped honeycomb structure
102: Outer peripheral side wall
104: First end surface
106: Second end surface
108: Cell
112: Partition wall
112a: One surface of partition wall
112b: The other surface of partition wall
200: Pillar-shaped honeycomb structure
202: Outer peripheral side wall
204: First end surface
206: Second end surface
208a: First cell
208b: Second cell
209: Sealing portion
212: Partition wall

The invention claimed is:

1. A pillar-shaped honeycomb structure, comprising an outer peripheral side wall, and a plurality of partition walls disposed on an inner peripheral side of the outer peripheral side wall, the plurality of partition walls partitioning a plurality of cells forming flow paths from a first end surface to a second end surface, wherein
an average pore diameter of the partition walls measured by a mercury porosimeter is 10 μm or less, and
when a cross section of the plurality of partition walls is observed with an X-ray microscope and porosities (%) of each partition wall is measured in a thickness direction from one surface to the other surface of each partition wall, an average porosity of each partition wall is 40 to 70%, and a difference between a maximum value and a minimum value of the porosity of each partition wall is 11% or less.

2. The pillar-shaped honeycomb structure according to claim 1, wherein the average pore diameter of the partition walls as measured by the mercury porosimeter is 3 to 10 μm.

3. The pillar-shaped honeycomb structure according to claim 1, wherein the plurality of partition walls has an average thickness of 50 to 150 μm.

4. The pillar-shaped honeycomb structure according to claim 1, wherein when the average porosity (%) of each partition wall is x and the difference (%) between the maximum value and the minimum value of the porosity of each partition wall is y, the following formula (A) is established:

$$\{5.2176-0.122(x-55)\}e^{-0.283y} \geq 0.5 \quad (A).$$

5. The pillar-shaped honeycomb structure according to claim 1, wherein an isostatic breaking strength is 0.5 MPa or more.

6. The pillar-shaped honeycomb structure according to claim 1, wherein a bulk density is 0.15 g/cc to 0.25 g/cc.

7. The pillar-shaped honeycomb structure according to claim 1, wherein the partition walls are made of ceramic containing 90% by mass or more of cordierite.

8. The pillar-shaped honeycomb structure according to claim 1, wherein a catalyst layer is provided on the surface of the partition walls.

\* \* \* \* \*